(12) United States Patent
Sachs et al.

(10) Patent No.: US 8,917,699 B2
(45) Date of Patent: Dec. 23, 2014

(54) USER NETWORK AND METHOD FOR USING MULTIPLE ACCESS SYSTEM TO CONNECT TO REMOTE COMMUNICATION NETWORK(S)

(75) Inventors: Joachim Sachs, Aachen (DE); Mikael Prytz, Rönninge (SE); Per Magnusson, Linköping (SE); Teemu Rinta-Aho, Espoo (FI)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1748 days.

(21) Appl. No.: 13/138,775

(22) PCT Filed: Sep. 20, 2006

(86) PCT No.: PCT/EP2006/066516
§ 371 (c)(1),
(2), (4) Date: Dec. 27, 2011

(87) PCT Pub. No.: WO2008/006408
PCT Pub. Date: Jan. 17, 2008

(65) Prior Publication Data
US 2012/0140732 A1 Jun. 7, 2012

(30) Foreign Application Priority Data
Jul. 12, 2006 (WO) ................. PCT/EP2006/064166

(51) Int. Cl.
*H04W 4/00* (2009.01)
*H04W 36/00* (2009.01)
(Continued)

(52) U.S. Cl.
CPC .......... *H04W 36/0083* (2013.01); *H04W 88/06* (2013.01); *H04W 36/14* (2013.01); *H04W 36/28* (2013.01); *H04W 92/02* (2013.01)

USPC ..................... 370/331; 455/435.1; 455/435.2; 455/435.3; 455/436; 455/422.1; 370/238; 370/310; 370/352

(58) Field of Classification Search
USPC ................................................... 370/331, 329
See application file for complete search history.

(56) References Cited

U.S. PATENT DOCUMENTS

| 8,396,472 B2 * | 3/2013 | Worrall et al. ................. 455/434 |
| 2002/0093938 A1 * | 7/2002 | Tourunen ....................... 370/349 |

(Continued)

OTHER PUBLICATIONS

"Mobile and Wireless Systems beyond 3G", D 2.2 MRA Architecture, Sixth Framework Programme, WWI Ambient Networks, Jan. 17, 2005, XP-002337899. Document responsible: Rolf Sigle (Alcatel).*

(Continued)

*Primary Examiner* — Faruk Hamza
*Assistant Examiner* — Shah R Zaman

(57) ABSTRACT

A user network (e.g., mobile phone) is described herein that uses one or more access systems to establish a communications session with a remote communications network. In one embodiment, the user network has a processor and a memory with instructions stored therein which are accessible and processable by the processor to facilitate the following steps: (a) maintaining a detected set which contains access resource (s) that are associated with possible access connection (s) which could be used to access the remote communications network; (b) maintaining a candidate set which contains access resource (s) and logical connection (s) that are associated with the possible access connection (s) which could be used as communication bearer (s) to the remote communications network; and (c) maintaining an active set which contains a particular logical connection which is associated with one of the access connections that is currently being used as a communication bearer in an established communication session with the remote communications network.

23 Claims, 8 Drawing Sheets

(51) Int. Cl.
 *H04W 88/06* (2009.01)
 *H04W 36/14* (2009.01)
 *H04W 36/28* (2009.01)
 *H04W 92/02* (2009.01)

(56) References Cited

U.S. PATENT DOCUMENTS

2004/0266436 A1\* 12/2004 Jaakkola et al. .............. 455/436
2007/0022425 A1\* 1/2007 Jackson ........................ 718/104
2007/0271369 A1\* 11/2007 Aydin et al. ................... 709/224

OTHER PUBLICATIONS

D 2.4 Multi-radio Access Architecture. Framework Programme, Ambient Networks, Dec. 22, 2005.
Sigle, R. MRA Architecture, Mobile and Wireless Systems beyond 3G. Internet Citation. Feb. 17, 2005. http://www.ambient-networks.org/publications/D2-2_PU.pdf.

\* cited by examiner

USER NETWORK AND METHOD FOR USING MULTIPLE ACCESS SYSTEM TO CONNECT TO REMOTE COMMUNICATION NETWORK(S)

CLAIMING BENEFIT OF PRIOR FILED PCT APPLICATION

This application claims the benefit of PCT Patent Application No. PCT/EP2006/064166 which was filed on Jul. 12, 2006 the contents of which are hereby incorporated by reference herein.

BACKGROUND OF THE INVENTION

1. Field of the Invention

The present invention relates in general to a user network and a method for using one or more access systems to establish communication session(s) with remote communications network(s).

2. Description of Related Art

Common acronyms are used in the following description of the prior art and the present invention. For convenience, the following glossary is provided:
AAA Authentication, Authorization and Accounting
AN Ambient Network
AS Active Set
CS Candidate Set
DS Detected Set
GLL Generic Link Layer
GSM Global System for Mobile Communications
HSPA High-Speed Packet Access
LTE Long Term Evolution (for 3G)
MRRM Multi-Radio Resource Management
UMTS Universal Mobile Telecommunications System
xDSL x Digital Subscriber Line
WLAN Wireless Local Area Network Ambient Networks (AN) is an integrated project which is co-sponsored by the European Commission under the Information Society Technology priority of the 6th Framework Programme (see http://www.ambient-networks.org). The AN project has a goal of providing scalable and affordable wireless networking in an environment which is populated by a multitude of user devices, wireless technologies, network operators and business actors. For instance, the AN project has a goal of enabling a user network to use one or more access systems to connect to a remote communications network. One way that this goal can be satisfied for the AN project and also for existing communication systems is the subject of the present invention.

Referring to FIG. 1 (PRIOR ART), there is shown a block diagram of an exemplary communication system 100 within which there is a user network 102 that utilizes one more access systems 104a, 104b . . . 104n to connect to a remote communications network 106. The user network 102 can be a single device, e.g. a user terminal like a mobile phone or a computer, with access capability provided by one reconfigurable access system or multiple access systems 104a, 104b . . . 104n. Alternatively, the user network 102 can be an interconnection of multiple nodes, like a personal area network or a moving network within a vehicle, where the access capabilities can be provided by the different nodes. The access systems 104a, 104b . . . 104n can be either a wireless access system such as GSM, UMTS, HSPA, LTE, WiMAX, WLAN, Bluetooth, etc. . . . and/or a fixed access system such as Ethernet, CableModem, xDSL, fiber, etc. . . . The availability and capabilities of the individual access systems 104a, 104b . . . 104n can vary over time, e.g. due to movement of the user network 102, changes in load in the access systems 104a, 104b . . . 104n, etc.

As shown, the user network 102 has many different types of possible access connections 108 which can exist with the remote communication network 106 (which has multiple access systems 110a, 110b . . . 110n). As a result, the user network 102 needs to be able to select one or more of these possible access connections 108 to establish one or more communication sessions with the remote communications network 106 (or multiple remote communications networks 106). In accordance with the AN project, the user network 102 has a processor 112 that uses a MRRM entity 114 and a GLL entity 116 to perform this access selection and to help establish the communication session(s) with the remote communications network 106 (or multiple remote communications networks 106). To accomplish this, the MRRM entity 114 maintains a number of different access sets (which are stored in memory 118) that happen to be classified as follows:

Detected Set (DS): is the set of possible access connections 108 that are detected by the user network 102.

Candidate Set (CS): is the set of suitable access connections 108 that can be used for a particular data bearer to the remote communications network 106.

Active Set (AS): is the set of access connections 108 that are used for a particular data bearer that has been established with the remote communications network 106. In the examples hereinafter, the AS contains one access connection 108 which is currently being used as a data bearer to the remote communications network 106.

Note 1: The AS can be further divided into MRRM AS and GLL AS however this separation is not relevant to the present discussion.

Note 2: The user network 102 has one DS and can have multiple CSs and ASs where a CS and an AS would exist for every data bearer which is transporting either user data or control data. For instance, a first CS and AS may exist for a speech transmission which requires a low bandwidth while a second CS and AS may be exist for a video stream which requires a high bandwidth.

Note 3: The exemplary remote communications network 106 shown herein includes two separate nodes 118a and 118b each of which has a base station 120a and 120b and a radio access controller 122a and 122b. In addition, the exemplary remote communications network 106 includes a single MRRM entity 124 and two GLL entities 126a and 126b.

Note 4: For a detailed discussion about the AN project, reference is made to the following documents where the contents of which are hereby incorporated by reference:
Ambient Networks, "Multi-Radio Access Architecture", Project Deliverable D2-4, December 2005.
Ambient Networks, "Multi-Radio Access Architecture", Project Deliverable D2-2, January 2005.
Ambient Networks, "Ambient Network Security", Project Deliverable D7-2, December 2005, (also Annex II of the deliverable).

The user network 102 and in particular the MRRM entity 114 and GLL entity 116 determines and maintains the possible access connection(s) 108 which can be used to establish the communication session(s) with the remote communications network 106 (or multiple remote communications networks 106). Basically, the GLL entity 116 monitors and observes the availability, capabilities and characteristics of each of the possible access connections 108 with the remote communications network 106 (or multiple remote communications networks 106). Then, the MRRM entity 114 uses this information and determines/validates which of the possible access connections 108 are to be admitted into the DS (in this example it is assumed that all of the possible access connections 108 are added to the DS). The MRRM entity 114 determines which of the possible access connections 108 within the DS are to be admitted into the CS. In addition, the MRRM entity 114 determines which of the possible access connections 108 within the CS are to be used as data bearer(s) for the communication session(s) with the remote communications network 106. During this access selection procedure, the user network 102 can encounter a problem which relates to the level of connectivity (during the DS-CS-AS phases) that needs to be established between the user network 102 and the remote communications network 106. A detailed description is provided next with respect to FIGS. 2-4 (PRIOR ART).

In the access systems 104a, 104b . . . 104n, the basic connectivity element is the access resource (AR). The AR is a resource which could be used for establishing connectivity and transmitting data. An AR can be identified by an AR identity which can be composed of the id of the resource owner such as the network id and a resource specific id such as a cell id in a wireless access system. For instance, the AR identity could be {network id; access type; resource id}. In addition, the AR can be further characterized by AR-related information/AR-descriptor, such as total/occupied/available resources, resource costs, efficiency of the resource usage like a signal-to-noise-and-interference ratio. Basically, the AR corresponds to the underlying physical resources which are associated with the specific access system, e.g. for a UMTS cell it may correspond to available power, a certain number of codes, etc. . . . .

The other connectivity element in the access systems 104a, 104b . . . 104n is the logical connection (LC). The access system 104a, 104b . . . 104n establishes the LC with the other access system 110a, 110b . . . 110n based on the corresponding access resource. For the establishment of a LC, identifiers (sometimes called locators) for that LC are created in the terminating access systems 104a, 104b . . . 104n and 110a, 110b . . . 110n. The setup of the LC can include: (1) reserving radio resources for the LC; (2) performing AAA procedures; (3) establishing LC security associations; and (4) negotiating LC usage policies. Basically, the AR provides the capability to establish the connectivity and the LC is the data bearer on which data could be transmitted.

The establishment of a LC (based on access resources) is referred to as network attachment. FIGS. 2-4 (PRIOR ART) illustrate three exemplary signal flow diagrams 200, 300 and 400 which are provided to indicate that there is a lot of signaling associated with establishing a network attachment. In FIG. 2, the signal flow diagram 200 shows an example of an attachment of a device to a cellular access system (e.g., the 3GPP LTE system described in 3GPP TR 23.882 V.1.2.3 (June 2006)). In FIG. 3, the signal flow diagram 300 shows an example of an attachment of a device to a WLAN network (the signaling shown includes link attachment, authentication, authorization, establishment of a security association for encryption and integrity protection, and IP address assignment). In FIG. 4, the signal flow diagram 400 shows an improved network attachment procedure which was developed by the AN project to help enable seamless connections between systems like the ones shown in FIGS. 2 and 3. These signal flow diagrams 200, 300 and 400 are well known to those skilled in the art and have been provided herein to simply indicate that it takes a lot of time and resources to establish a LC.

In reviewing the signal flow diagrams 200, 300 and 400, it can be seen that there is a problem which needs to be solved and this problem relates to which phase of the access selection procedure should an AR be converted into a LC for selected access connections 108. Again, the AS contains the LC(s) which are associated with existing/active access connection(s) 108. Somewhere, the AS's logical connections(s) have to be established using the access resources in the chain DS-CS-AS. This particular need and other needs are satisfied by the user network and the access selection method of the present invention.

BRIEF DESCRIPTION OF THE INVENTION

A user network (e.g., mobile phone) is described herein that uses one or more access systems to establish a communications session with a remote communications network. In one embodiment, the user network has a processor and a memory with instructions stored therein which are accessible and processable by the processor to facilitate the following steps: (a) maintaining a detected set which contains access resource (s) that are associated with possible access connection(s) which could be used to access the remote communications network; (b) maintaining a candidate set which is adapted to contain access resource(s) and logical connection(s) that are associated with the possible access connection(s) which could be used as communication bearer(s) to the remote communications network; and (c) maintaining an active set which contains a particular logical connection which is associated with one of the access connections that is currently being used as a communication bearer in an established communication session with the remote communications network.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

Figure 1:
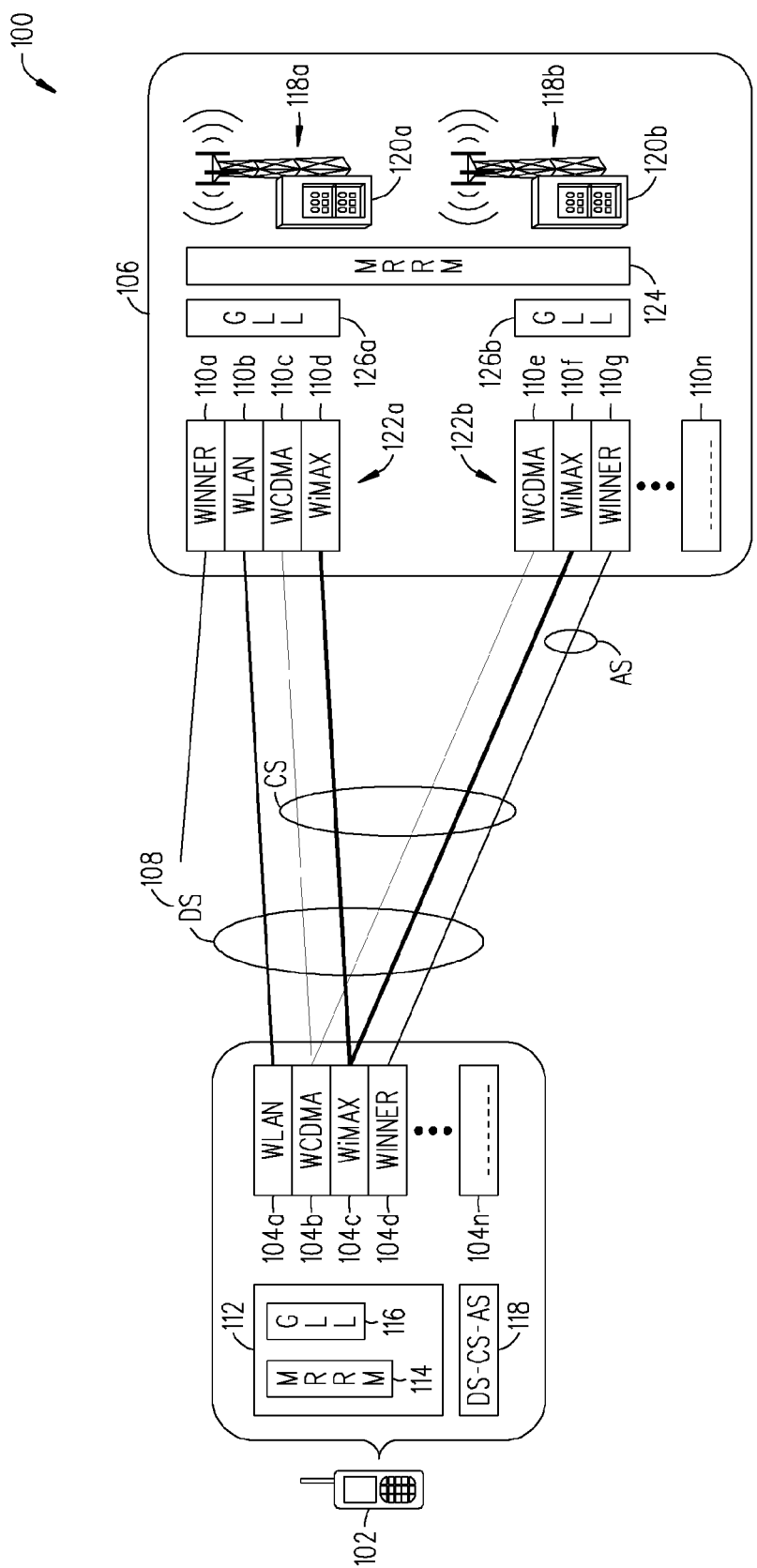
FIG. 1 (PRIOR ART) is a block diagram of a communication system which is used to help explain how a user network with one more access systems can establish communication session (s) with a remote communications network (or multiple remote communications networks)
Figure 2:
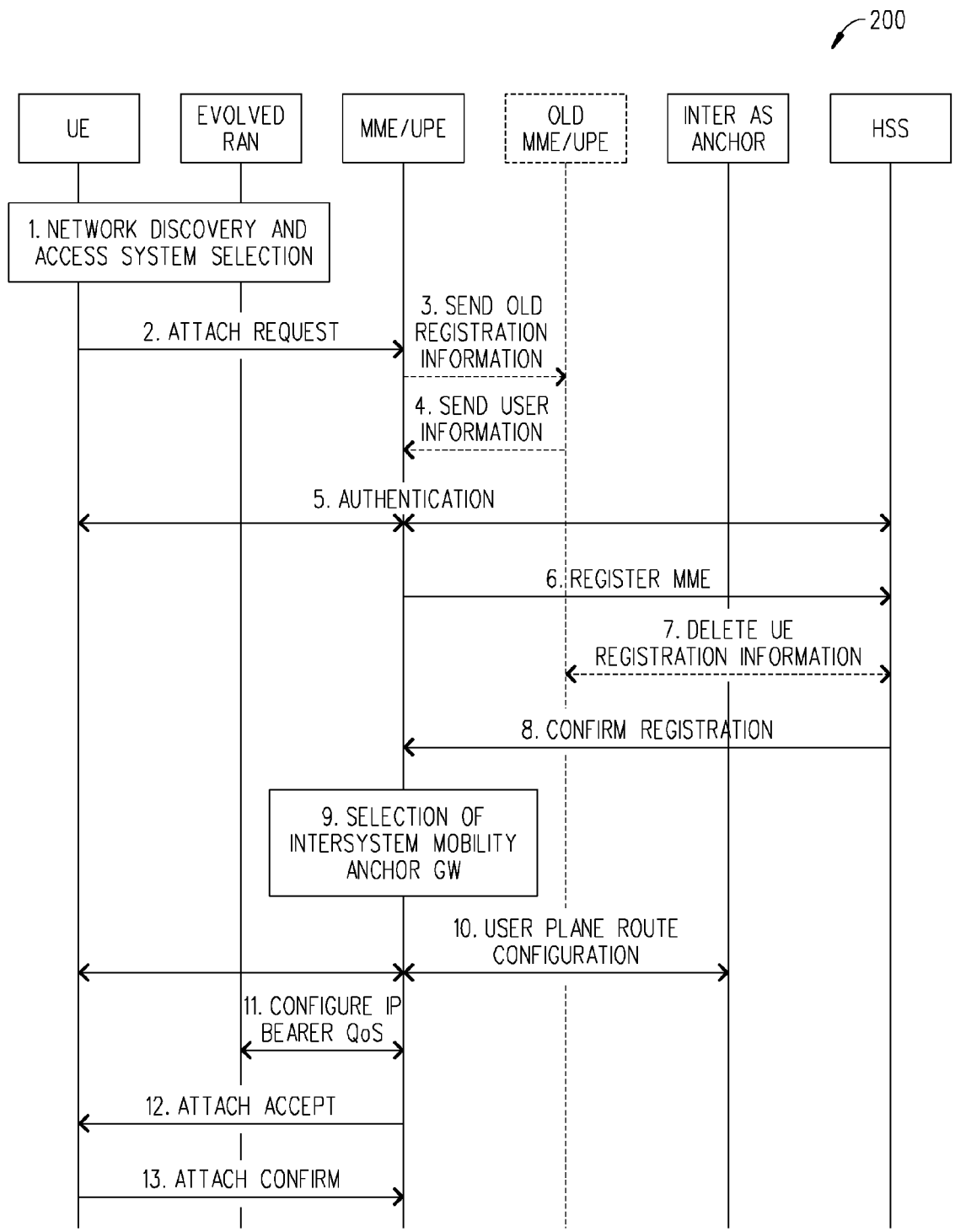
FIGS. 2-4 (PRIOR ART) are three exemplary signal flow diagrams which are provided to indicate that it takes a lot of signaling to establish a network attachment (logical connection) between a user network and a remote communications network.
Figure 3:
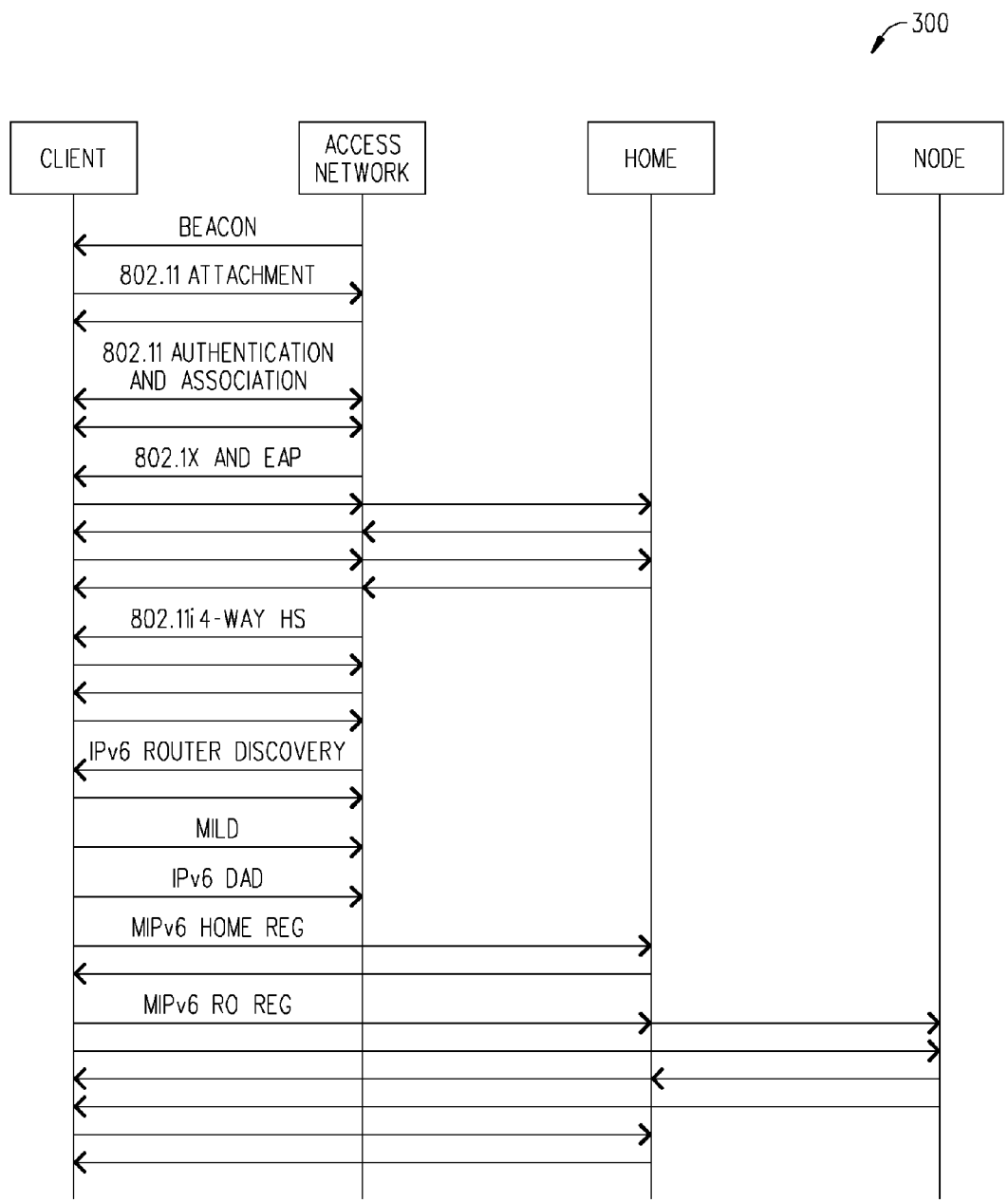
Figure 4:
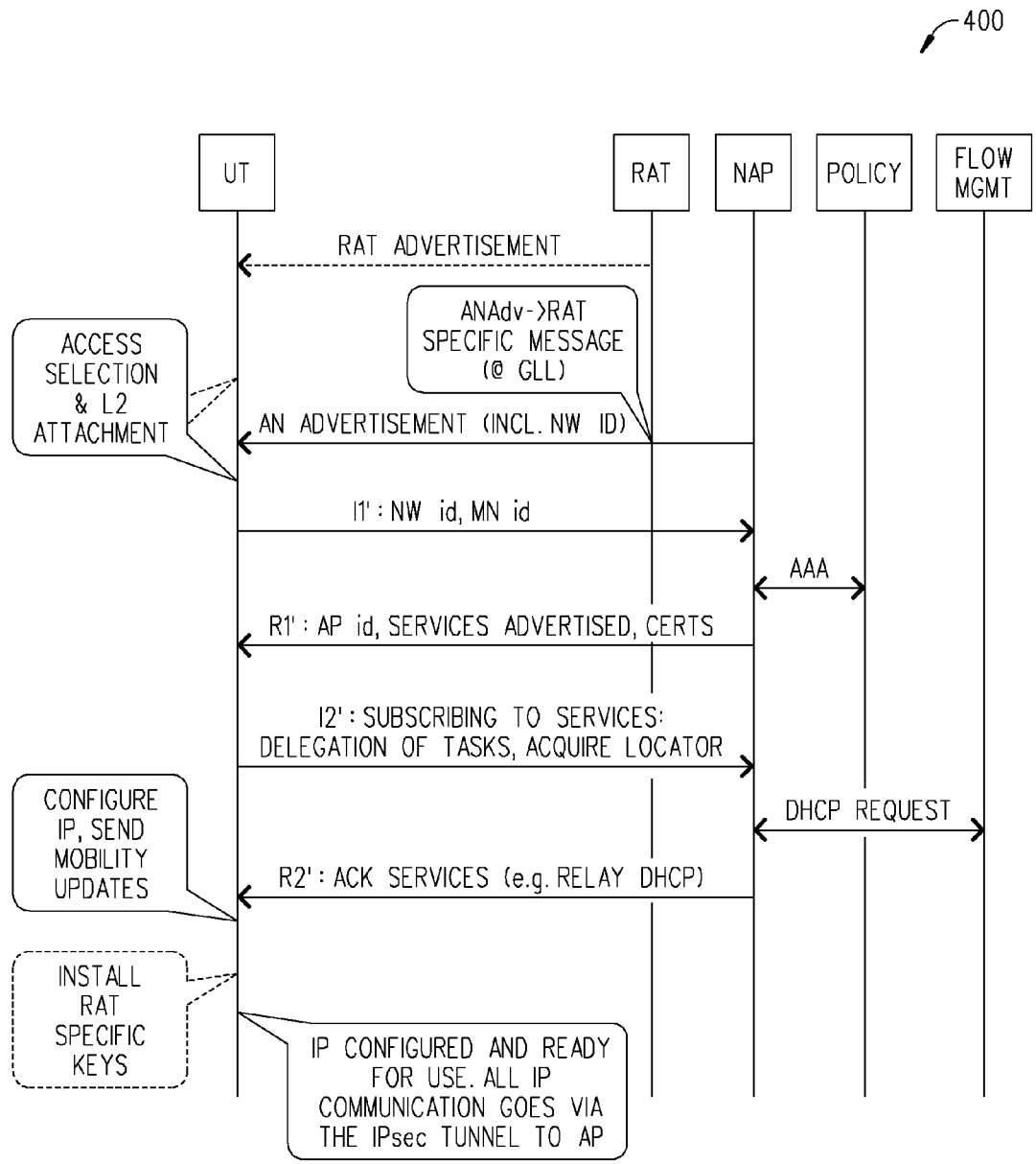
Figure 5:
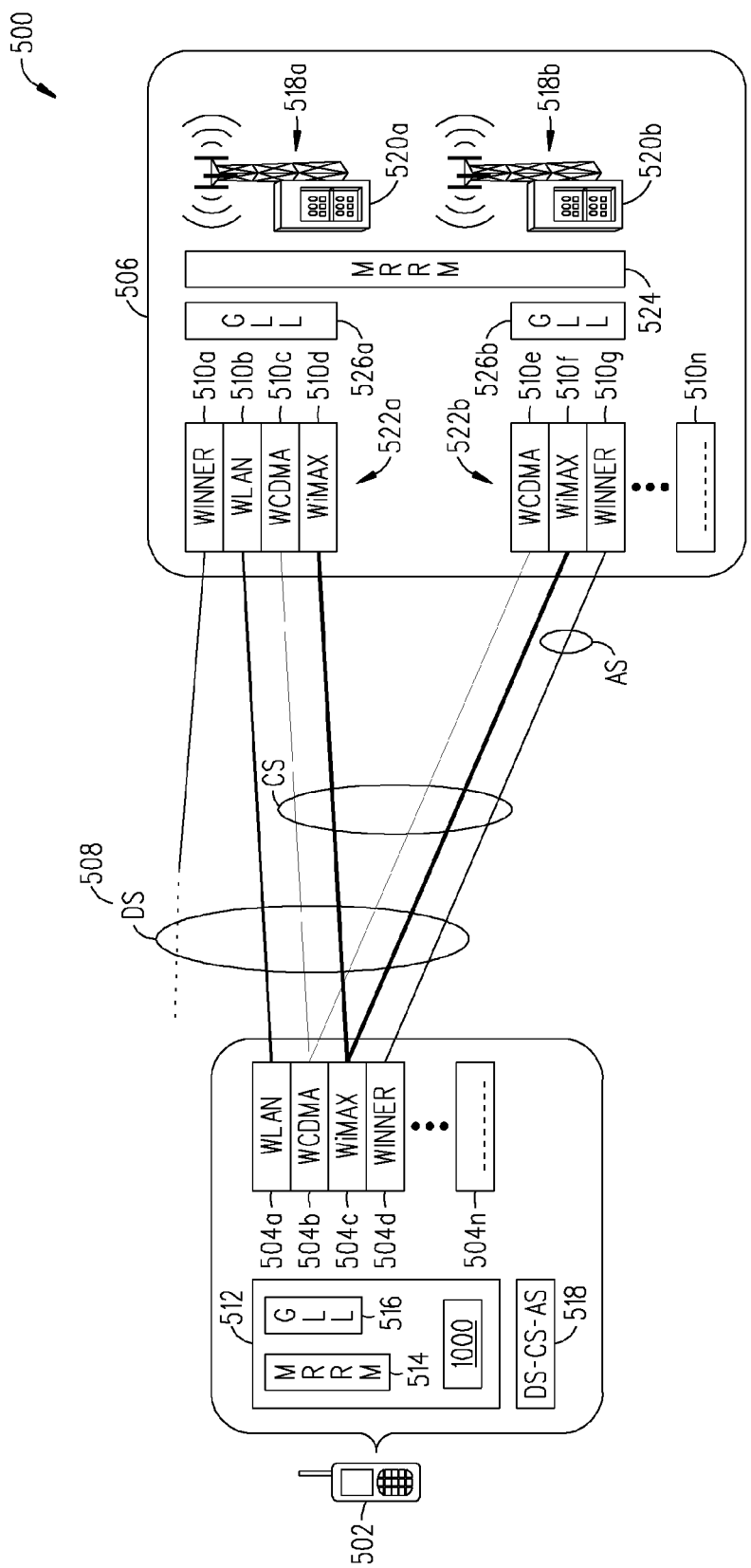
FIG. 5 is a block diagram of an exemplary communication system which is used to help explain how a user network with one more access systems can establish communication session (s) with remote communications network (s) in accordance with the present invention.

Referring to FIG. 5, there is shown a block diagram of an exemplary communication system 500 within which there is a user network 502 that utilizes one more access systems 504a, 504b ... 504n to connect to a remote communication network 506 in accordance with the present invention. The communication system 500 has basically the same components and basically the same functionality as the prior art communication system 100 except that the new user network 502 implements method 1000 to solve the aforementioned problem as to which phase of the access selection procedure should an AR be converted into a LC for a possible access connection 508. A detailed description about the different steps of method 1000 is provided after a discussion about: (1) how the user network 502 determines and maintains all of the possible access connection(s) 508 within the DS-CS-AS (see FIG. 6); (2) the pros and cons that occur when the CS contains only ARs for the possible access connections 508 (see first scenario in FIG. 7); and (3) the pros and cons that occur when the CS contains only LCs for the possible access connections 508 (see second scenario in FIG. 8).

Figure 6:
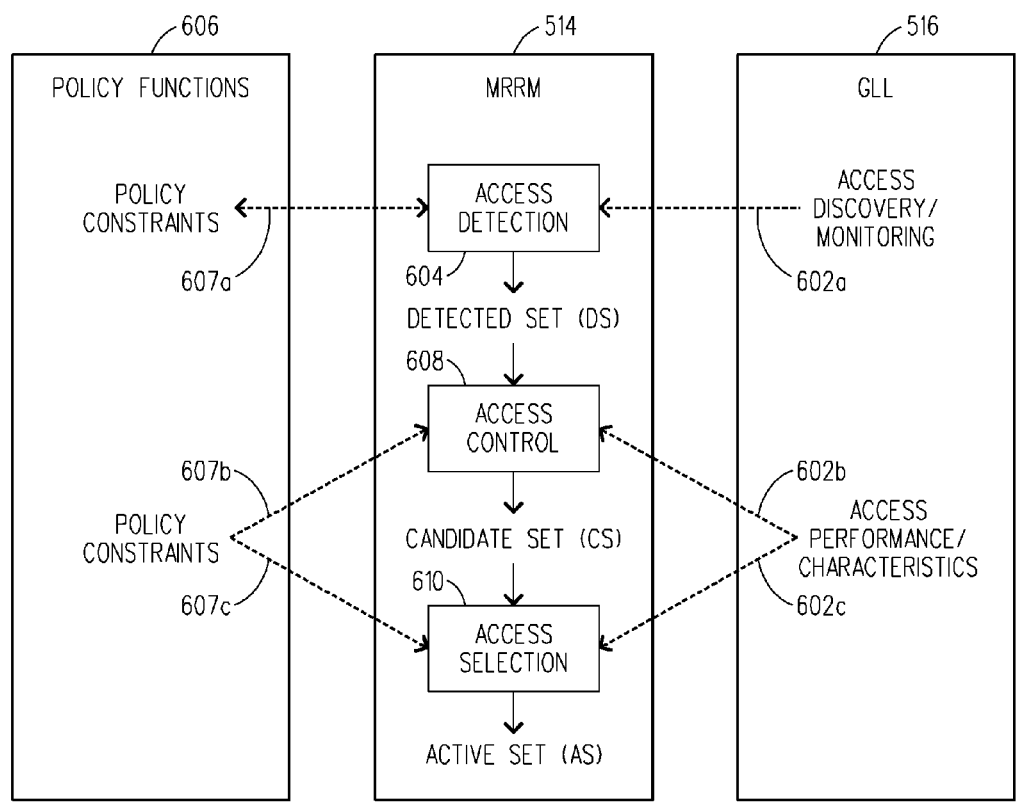
FIG. 6 is a diagram which is used to help explain in greater detail how the user network (in particular an MRRM entity and a GLL entity) determines and maintains possible access connection (s) which can be used to establish the communication session (s) with the remote communications network(s) in accordance with the present invention.
Figure 7:
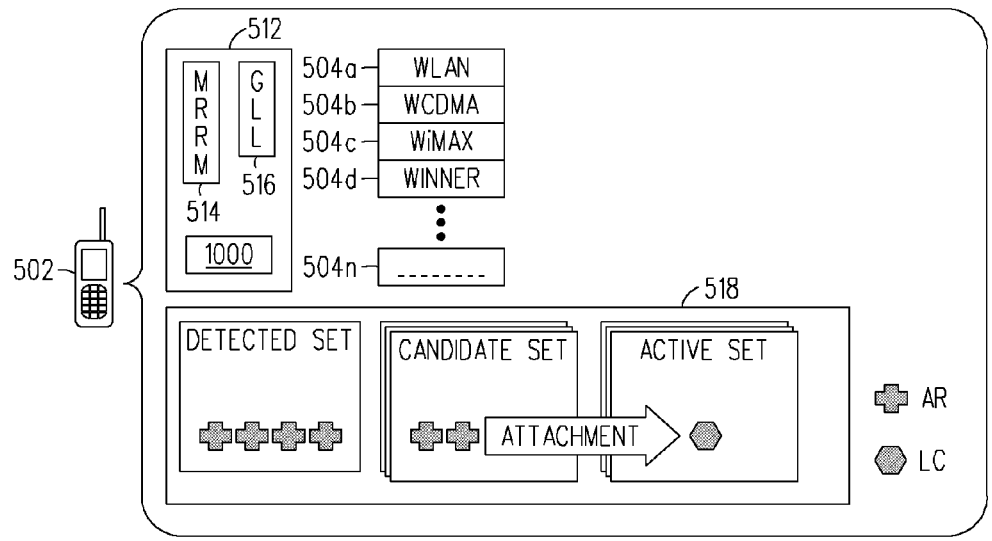
FIG. 7 is a diagram which is used to help explain the pros and cons when the user network maintains a candidate set which contains only ARs for the possible access connections to the remote communications network(s)

Referring to FIG. 6, there is illustrated a diagram which is used to help explain how an advantageous user network 502 (in particular the MRRM entity 514 and GLL entity 516) determines and maintains the possible access connection(s) 508 which can be used to establish the communication session(s) with the remote communications network 506 (or multiple remote communications networks 506). Basically, the GLL entity 516 monitors and observes the availability, capabilities and characteristics of each of the possible access connections 508 with the remote communications network 506 (or multiple remote communications networks 506). For instance, the GLL entity 516 can conduct quality measurements on the possible access connections 508 by measuring the field strength of a beacon signal and/or by measuring the possible bandwidth/access load based on broadcast information. Then, the GLL entity 516 reports this information to the MRRM entity 514 (see dashed lines indicated by numerals 602a, 602b and 602c). Further, this information does not need to be retrieved from the broadcast information but instead it could be obtained from dedicated messages (e.g., after network attachment or via an already attached access). Alternatively, the MRRM entity 514 can obtain information/parameters which are signaled from other entities, like e.g., MRRM 524 in the remote network 502.

As shown, the MRRM entity 514 has an access detection function 604 which determines/validates which of the possible access connections 508 are to be admitted into the DS (in this example it is assumed that all of the possible access connections 508 are added to the DS). In particular, the MRRM entity 514 implements the access detection function 604 which interacts with a policy function 606 to obtain policy constraints 607a (e.g., security functions, compensation functions, local policies) and then uses this policy information 607a along with the access discovery/monitoring information 602a (received from the GLL entity 516) to determine/validate which of the possible access connections 508 are to be admitted into the DS.

In addition, the MRRM entity 514 has an access control function 608 which interacts with the policy function 606 to obtain policy constraints 607b and then uses this information along with the access performance/characteristics information 602b (received from the GLL entity 516) to determine which of the possible access connections 508 within the DS are to be admitted into the CS. In other words, the MRRM entity 514 implements the access control function 608 and determines/validates which of the possible access connections 508 within the DS could be used as communication bearer(s) to the remote communications network 506. This process is performed for each communications session (data session) which means that there can be multiple CSs. And, the access connections 508 which are placed within anyone of the CSs depends on the requirements of the particular communication session (data session) (e.g., the quality of service, required security, acceptable amount of costs etc. ...) and to what extent these requirements are met by the access systems 504a, 504b ... 504n and 510a, 510b ... 510n. Also, the policy constraints 607b can dictate which of the access connections 508 can be admitted to the CSs.

Furthermore, the MRRM entity 514 has an access selection function 610 which interacts with the policy function 606 to obtain policy constraints 607c and then uses this information along with the access performance/characteristics information 602c (received from the GLL entity 516) to determine which of the possible access connections 508 within the CS are to be used as data bearer(s) for the communication session(s) with the remote communications network 506. In other words, the MRRM entity 514 implements the access selection function 610 to determine which one of the possible access connections 508 in the CS is to be placed in the AS and actually used as a communication bearer in a communication session that is established with the remote communications network 506. Typically, the access connection 508 which is best suited to be used for a particular communication session (data session) is selected from the CS to be placed within the AS. There are different types of access selection algorithms which can be used for this selection, e.g. an algorithm which chooses the particular access connection 508 that best matches the data session requirements, an algorithm which chooses the particular access connection 508 which has access resources that are used most efficiently, an algorithm which chooses the particular access connection 508 based on transmission costs, or various combinations of such strategies. More generally, this AS selection can be seen as an optimization with respect to a certain cost or utility function. A detailed discussion is provided below to explain how the access selection method 1000 affects the policy functions 606 so as to control how many ARs and/or LCs are to be maintained in the CS.

Referring back to FIG. 5, the user network 502 has a processor 512 (including the MRRM entity 514 and the GLL entity 516) and a memory 518 (which stores the information associated with the DS, CS and AS). Alternatively, the user network 502 can have multiple GLL entities 516 (e.g., one per access technology). Moreover, the MRRM functionality can be distributed onto several entities, they may even be distributed among different networks, for example, some processing can be done in MRRM entity 624 and some in MRRM entity 614 and the MRRM entities 614 and 624 can exchange information for MRRM processing. As described next, there are pros and cons that occur when the CS contains only ARs for the possible access connections 508 (see the scenario shown in FIG. 7). In this scenario, assume that the user network 502 functions such that the CS contains only ARs and an LC is established before it is placed within the AS. This scenario has the following consequences:

- The monitoring of an AR in the CS requires little effort (processing, battery usage). For instance, it can be sufficient to only listen to the beacon signals which are regularly sent by the remote communication network(s) 506.
- The precision of AR information is not so precise, e.g. because it is only estimated prior to the real establishment of connectivity. This can lead to a higher risk of access selection failure. For example, assume the user network 502 estimated that it could access the remote communication network 506 with a certain quality of service and costs, but during network attachment and policy negotiation less resources and higher costs than expected are detected (this could lead to the access being completely removed from the CS after validation with the policy functions). In the worst case, the admission control could reject the establishment of a connection.
- The network attachment becomes part of the transition of an access connection 508 from CS to AS. This can introduce an additional delay in the access selection procedure.
- This is applicable to a user network 502 with a single access module (e.g. a software-reconfigurable-access module, which can only use one access system 504*a* at a time with scanning periods for other access systems 504*b* . . . 504*n* in between). It is, of course, also applicable to a user network 502 with multiple access modules 504*a*, 504*b* . . . 504*n*.

Figure 8:
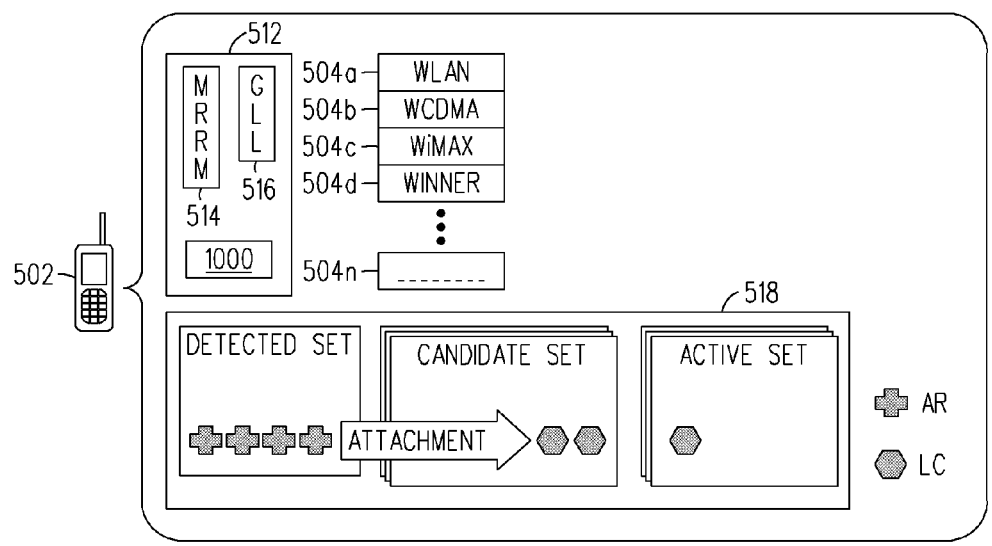
FIG. 8 is a diagram which is used to help explain the pros and cons when the user network maintains a candidate set which contains only LCs for the possible access connections to the remote communications network(s)

As described next, there are also pros and cons that occur when the CS contains only LCs for the possible access connections 508 (see the scenario shown in FIG. 8). In this scenario, assume that the user network 502 functions such that LCs need to be established before a possible access connection 508 can be placed within the CS. This scenario has the following consequences:

- The elements in the CS have already undergone network attachment which required substantial signaling and substantial time.
- Access resources have been reserved for the LCs.
- The management of LCs requires substantially more resources than ARs. For instance, the LC connectivity needs to be maintained which requires processing, battery usage, etc. . . . . Moreover, multiple active LCs may need to be maintained.
- The reserved resources for the management of an LC can be wasted if the LC remains in the CS and never becomes active by being assigned to the AS.
- The activation of an LC (transition from CS to AS) is fast, since the LC establishment has already been performed.
- The access related information (performance, costs, resources, policies) is very precise, since there are established connections for the LCs.
- This scenario requires that the user network 502 have multiple access modules 504*a*, 504*b* . . . 504*n* because multiple LCs can be functioning at the same time.

Figure 9:
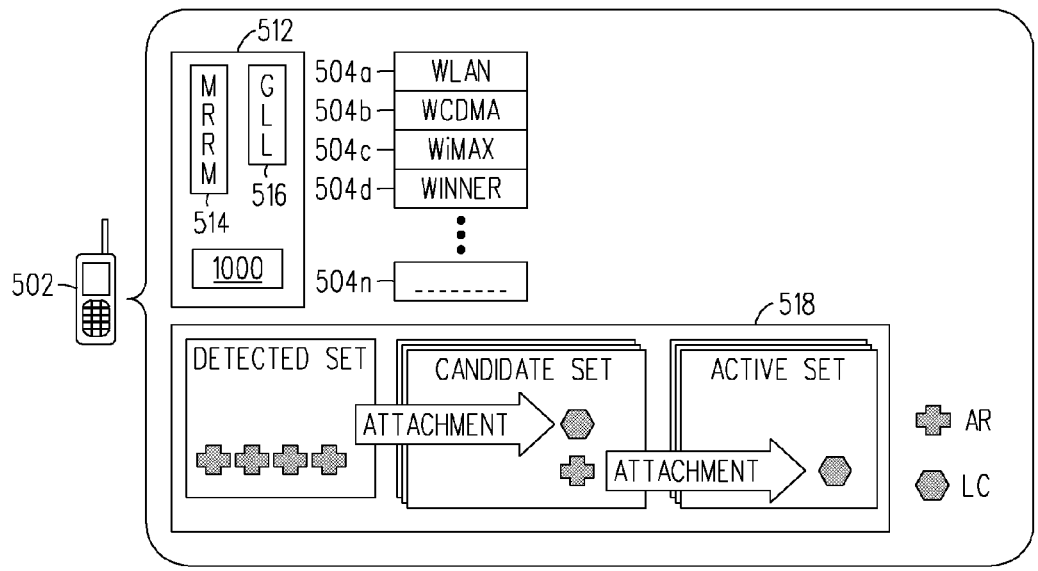
FIG. 9 is a diagram which is used to help explain the pros and cons when the user network maintains a candidate set which contains both ARs and LCs for the possible access connections to the remote communications network(s) in accordance with the present invention.

The two scenarios each have pros and cons however neither of these scenarios by themselves would be suitable for all circumstances because the kind of information and the precision of information about the possible access connections 508 which is monitored varies greatly. However, the method 1000 of the present invention solves this problem because it enables the user network 502 to maintain both ARs and LCs within the CS (see FIG. 9).

Figure 10:
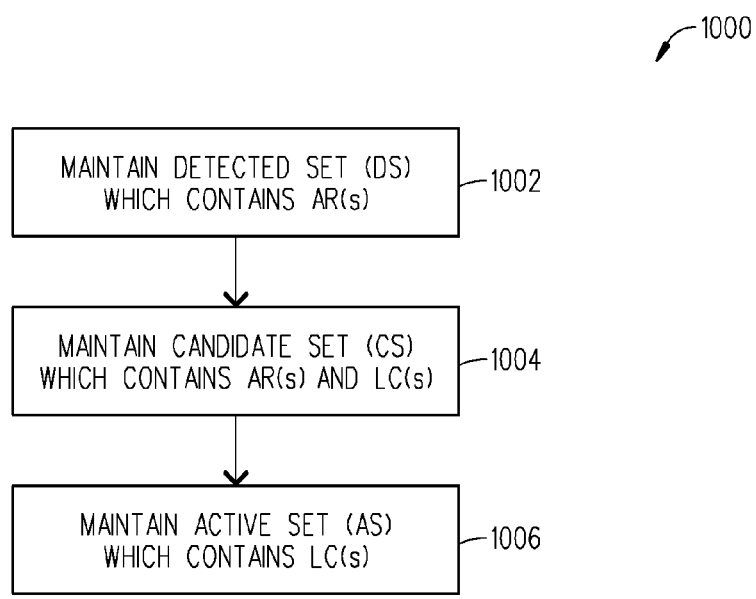
FIG. 10 is a flowchart illustrating the basic steps of the method for enabling the user network to connect to the remote communications network(s) in accordance with the present invention.

Referring to FIG. 10, there is a flowchart illustrating the basic steps of the access selection method 1000 in accordance with the present invention. Beginning at step 1002, the user network 502 (in particular the MRRM entity 514) performs an access detection function and populates/maintains the DS which contains ARs associated with the possible access connection(s) 508 that could be used to access the remote communications network 506 (or multiple remote communications networks 506). At step 1004, the user network 502 (in particular the MRRM entity 514) performs an access control function and populates/maintains the CS which contains AR(s) and LC(s) that are associated with the possible access connection (s) 508 which could be used as communication bearer(s) to the remote communications network 506 (or multiple remote communications networks 506). At step 1006, the user network 502 (in particular the MRRM entity 514) performs an access selection function and populates/maintains the AS which contains the LC(s) associated with the access connection (s) 508 which are currently being used as communication bearer(s) in established communication session(s) with the remote communications network 506 (or multiple remote communications networks 506). A discussion is provided next to describe several different schemes associated with how the user network 502 and in particular the MRRM entity 514 can maintain both AR(s) and LC(s) within the CS pursuant to step 1002.

The MRRM entity 514 can determine if a possible access connection 508 is to be included as an AR (prior to network attachment and flow setup) or a LC (after network attachment and flow setup) within the CS by using predetermined rules or by making a decision based on information that is available for the possible access connection(s) 508 and the reliability of that information. For instance, the MRRM entity 514 can decide to admit a possible access connection 508 as an AR within the CS if:

- Sufficient information is received from scanning the access networks 504*a*, 504*b* . . . 504*n* and the reliability of this information is beyond a certain threshold (see following notes 1 and 2). For example:
  - If the access quality is determined to be sufficiently good.
  - If the remote network id is known and present in a list of trusted/acceptable remote communications networks 506. For example:
    - The policies for this remote communications network 506 where good when a previous access connection 508 was used to connect with this particular remote communications network 506.
    - The user network 502 has already or is currently using another data bearer to connect to this remote communications network 506.

Note 1: This information can be obtained by receiving and scanning the beacons (or access/network advertisements) from different access networks 504*a*, 504*b* . . . 504*n* which can result in obtaining a wide variety of information that can be used by the MRRM entity 514 in determining whether an AR or a LC should be used in the CS. For instance, the information within a beacon can include network id and cell id (=access resource id) and some signals can even include an estimate of the achievable signal-quality (signal-to-interference-and-noise-ratio). In addition, the beacon can include information such as available resources, used resources, total capacity, network services (type of connectivity, e.g. IPv4 or IPv6), policies, charging rules, list of cooperating networks etc. . . . .

Note 2: This information can also be obtained for an AR without needing a prior network attachment. For example, if the user network 502 already has an access connection 508 with the remote communications network 506, then the user network 502 can use this existing access connection to request additional information for an AR associated with another access connection 508.

In contrast, the MRRM entity 516 can decide to admit a possible access connection 508 as an LC within the CS if:

The information received from scanning the access networks 504a, 504b . . . 504n is not sufficient or the reliability of this information is below a certain threshold.

If fast access selection is desired where the network attachment procedure and flow setup would take too long.

An advantage of maintaining both ARs and LCs in the CS is that the MRRM entity 514 now has the freedom to balance the following:

Delay of access selection (time to move an element from CS to AS).

If dynamic access selection algorithms are to be used or system parameters influencing access selection change quickly, then the MRRM entity 514 can decide to perform network attachment for a possible access connection 508 before adding it to the CS (CS contains more LCs).

Control resource consumption (amount of resources used by elements in CS).

If system resources are scarce (in the remote communications network 506 or in the user network 502, e.g. battery), then the MRRM entity 514 can decide to perform network attachment only when a possible access connection 508 becomes active (CS contains more ARs).

Precision/reliability of the access selection (based on the amount of information available for the elements in the CS).

Another advantage of maintaining both ARs and LCs in the CS is that the MRRM entity 514 can now adapt the access selection function as follows:

If ARs are in the CS, then the MRRM entity 514 anticipates longer access handover delays because network attachment and flow setup are going to be required.

If ARs are in the CS, then the MRRM entity 514 adapts access selection thresholds, such that the network attachment and flow setup can be started in advance of an access handover.

If LCs are in the CS, then the MRRM entity 514 anticipates shorter access handover delays.

Yet another advantage of maintaining both ARs and LCs in the CS is that the MRRM entity 514 can help with the battery efficiency (within the user network 502—mobile phone 502) by allowing more ARs (which require only passive scanning) to be included in the CS. Plus, if too many LCs are in the CS, then the MRRM entity 514 can reduce the total number of elements in the CS to reduce the amount of overhead which in turn helps with the efficient use of the battery.

From the foregoing, it should be appreciated that the present invention relates to a user network 502 (MRRM entity 514) which can maintain both ARs and LCs for possible access connections 508 within a CS. In addition, it should be noted that the user network 502 (MRRM entity 514) can move LCs back into the CS from the AS in addition to moving ARs from the DS into the CS. Lastly, it should be noted that the user network 502 (MRRM entity 514) can change a LC to an AR (and vice-versa) within the CS based on pre-determined triggers (e.g., regular intervals or if there are changing parameters such as a low battery level is detected) so the network attachment/detachment can happen within the CS.

Although one embodiment of the present invention has been illustrated in the accompanying Drawings and described in the foregoing Detailed Description, it should be understood that the invention is not limited to the disclosed embodiment, but is also capable of numerous rearrangements, modifications and substitutions without departing from the spirit of the invention as set forth and defined by the following claims.

What is claimed is:

1. A method for enabling a user network to connect to a remote communications network, said method comprising the steps of:

maintaining a detected set which contains access resource(s) that are associated with possible access connection(s) which could be used to access the remote communications network ;

maintaining a candidate set which is adapted to contain access resource(s) and logical connection(s) that are associated with the possible access connection(s) which could be used as communication bearer(s) to the remote communications network, wherein said step of maintaining said candidate set further includes determining whether at least one of the possible access connection(s) is an access resource or a logical connection in said candidate set; and maintaining an active set which contains a particular logical connection which is associated with one of the possible access connection(s) that is being used as a communication bearer in an established communication session with the remote communications network.

2. The method of claim 1, wherein said determining step further includes utilizing a set of predetermined rules to determine which of the possible access connection(s) is/are to be added as access resource(s) into said candidate set and which of the possible access connection(s) is/are to be added as logical connection(s) into said candidate set.

3. The method of claim 2, wherein said step of utilizing the set of predetermined rules includes:

adding a larger number of the possible access connection(s) as access resource(s) into said candidate set when there is a scarce system resource; or adding a larger number of the possible access connection(s) as logical connection(s) into said candidate set when a dynamic access selection procedure is used and/or when system parameters change quickly.

4. The method of claim 1, wherein said determining step further includes utilizing information which is available for each of the possible access connection(s) to determine which of the possible access connection(s) is/are to be added as access resource(s) into said candidate set and which of the possible access connection(s) is/are to be added as logical connection(s) into said candidate set.

5. The method of claim 4, wherein one of the possible access connection(s) is added as an access resource into said candidate set if:

the information associated with the one possible access connection indicated that said one possible access connection had an access quality which was greater than a predetermined threshold; and/or the information associated with the one possible access connection indicated that said one possible access connection was associated with a trusted/acceptable remote communications network.

6. The method of claim 4, wherein one of the possible access connection(s) is added as a logical connection into said candidate set if:

the information associated with the one possible access connection was not sufficient or indicated that said one possible access connection had an access quality which was below a predetermined threshold; and/or a fast access selection was desired and a network attachment and flow setup would take too long to change the access resource of the one possible access connection into the logical connection.

7. The method of claim 4, further comprising a step of obtaining the information associated with one of the possible access connection(s) from:

an access resource advertisement sent from the remote communications network ;

said memory which contains pre-stored access resource information;

said remote communications network with which there is a logical connection established that is associated with said one possible access connection; and/or said remote communication network which communicates with another remote communication network with which there is a logical connection established that is associated with another one of the possible access connections.

8. The method of claim 1, further comprising a step of adapting an access selection procedure associated with said active set based on how many access resource(s) and/or logical connection(s) are maintained within said candidate set wherein if:

there is a large number of access resource(s) within said candidate set then:

anticipating a long handover delay for one of the possible access connection(s) which is being used as the communication bearer in the established communication session with the remote communications network ; and/or adapting an access selection threshold(s) such that network attachment and flow setup which are needed to convert the access resource(s) into logical connection(s) can be started in advance of a handover of one of the possible access connection(s) which is being used as the communication bearer in the established communication session with the remote communications network.

9. The method of claim 1, further comprising a step of adapting an access selection procedure associated with said active set based on how many access resource(s) and/or logical connection(s) are maintained within said candidate set wherein if:

there is a large number of logical connection(s) within said candidate set then:

anticipating shorter handover delays for one of the possible access connection(s) which is being used as the communication bearer in the established communication session with the remote communications network ; and/or reducing the number of logical connection(s) within said candidate set to reduce overhead needed to maintain the logical connection(s) within said candidate set.

10. The method of claim 1, wherein:

said access resource is a resource that has not yet undergone a network attachment and a flow setup with the remote communications network; and said logical connection is based on an access resource that has undergone a network attachment and a flow setup with the remote communications network.

11. The method of claim 1, wherein said user network is a user terminal which has a plurality of access entities which are associated with:

a wireless access system including GSM, UMTS, HSPA, LTE, WiMAX, WLAN and/or Bluetooth; and/or a fixed access system including Ethernet, CableModem, xDSL and/or Fiber.

12. A user network comprising:

a processor adapted to facilitate the maintaining of a candidate set by determining whether at least one of possible access connection(s) is an access resource or a logical connection in said candidate set; and a memory with instructions stored therein which are accessible and processable by said processor to facilitate the following steps:

maintaining a detected set which contains access resource(s) that are associated with the possible access connection(s) which could be used to access a remote communications network;

maintaining the candidate set which is adapted to contain access resource(s) and logical connection(s) that are associated with the possible access connection(s) which could be used as communication bearer(s) to the remote communications network; and maintaining an active set which contains a particular logical connection which is associated with one of the possible access connection(s) that is being used as a communication bearer in an established communication session with the remote communications network.

13. The user network of claim 12, wherein said processor facilitates said determining step by utilizing a set of predetermined rules to determine which of the possible access connection(s) is/are to be added as access resource(s) into said candidate set and which of the possible access connection(s) is/are to be added as logical connection(s) into said candidate set.

14. The user network of claim 13, wherein:

said processor adds a larger number of the possible access connection(s) as access resource(s) into said candidate set when there is a scarce system resource; or said processor adds a larger number of the possible access connection(s) as logical connection(s) into said candidate set when a dynamic access selection procedure is used and/or when system parameters change quickly.

15. The user network of claim 12, wherein said processor facilitates said determining step by utilizing information which is available for each of the possible access connection(s) to determine which of the possible access connection(s) is/are to be added as access resource(s) into said candidate set and which of the possible access connection(s) is/are to be added as logical connection(s) into said candidate set.

16. The user network of claim 15, wherein said processor adds one of the possible access connection(s) as an access resource to said candidate set if:

the information associated with the one possible access connection indicated that said one possible access connection had an access quality which was greater than a predetermined threshold; and/or the information associated with the one possible access connection indicated that said one possible access connection was associated with a trusted/acceptable remote communications network .

17. The user network of claim 15, wherein said processor adds one of the possible access connection(s) as a logical connection to said candidate set if:

the information associated with the one possible access connection was not sufficient or indicated that said one possible access connection had an access quality which was below a predetermined threshold; and/or a fast access selection was desired and a network attachment and flow setup would take too long to change the access resource of the one possible access connection into the logical connection.

18. The user network of claim 15, wherein said processor obtains the information associated with one of the possible access connection(s) from:
   an access resource advertisement sent from the remote communications network;
   said memory which contains pre-stored access resource information;
   said remote communications network with which there is a logical connection established that is associated with said one possible access connection; and/or another remote communication network with which there is a logical connection established that is associated with another one of the possible access connections.

19. The user network of claim 12, wherein said processor adapts an access selection procedure associated with said active set based on how many access resource(s) and/or logical connection(s) are maintained within said candidate set wherein if:
   there is a large number of access resource (s) within said candidate set then:
   anticipating a long handover delay for one of the possible access connection(s) which is being used as the communication bearer in the established communication session with the remote communications network; and/or
   adapting an access selection threshold(s) such that network attachment and flow setup which are needed to convert the access resource(s) into logical connection(s) can be started in advance of a handover of one of the possible access connection(s) which is being used as the communication bearer in the established communication session with the remote communications network.

20. The user network of claim 12, wherein said processor adapts an access selection procedure associated with said active set based on how many access resource(s) and/or logical connection(s) are maintained within said candidate set wherein if:
   there is a large number of logical connection(s) within said candidate set then:
   anticipating shorter handover delays for one of the possible access connection(s) which is being used as the communication bearer in the established communication session with the remote communications network; and/or
   reducing the number of logical connection(s) within said candidate set to reduce overhead needed to maintain the logical connection(s) within said candidate set.

21. The user network of claim 12, wherein:
   said access resource is a resource that has not yet undergone a network attachment and a flow setup with the remote communications network; and
   said logical connection is based on an access resource that has undergone a network attachment and a flow setup with the remote communications network.

22. The user network of claim 12, further comprising a plurality of access entities which are associated with:
   a wireless access system including GSM, UMTS, HSPA, LTE, WiMAX, WLAN and/or Bluetooth; and/or a fixed access system including Ethernet, CableModem, xDSL and/or Fiber.

23. A method for access control in a communication system with a plurality of access systems, the access systems providing access resources for connection of user terminals to the communication system, wherein a logical connection using one or more of the access resources can be established, wherein the selected user terminal has a detected set, the detected set comprising at least one access resource which is identified to the selected user terminal as potential resource(s) which can be used for an access to the communication system, and at least one active set of at least one logical connection for which a data session is established between the user terminal and the communication system, and a candidate set, the candidate set being adapted to comprise both access resources and logical connections as members, wherein the members are selected based on the detected set and wherein the logical connections in the active set are selected based on the candidate set, wherein a determination is performed whether a member of the candidate set is going to be a logical connection or an access resource.

\* \* \* \* \*

UNITED STATES PATENT AND TRADEMARK OFFICE
CERTIFICATE OF CORRECTION

PATENT NO.         : 8,917,699 B2                                   Page 1 of 2
APPLICATION NO.    : 13/138775
DATED              : December 23, 2014
INVENTOR(S)        : Sachs et al.

It is certified that error appears in the above-identified patent and that said Letters Patent is hereby corrected as shown below:

On the Title Page, in item (54), in Title, in Column 1, Line 3, delete "COMMUNICATION" and insert -- COMMUNICATIONS --, therefor.

On the Title Page, in item (57), under "ABSTRACT", in Column 2, Line 7, delete "resource (s)" and insert -- resource(s) --, therefor at each occurrence throughout the Issued Patent.

On the Title Page, in item (57), under "ABSTRACT", in Column 2, Line 8, delete "connection (s)" and insert -- connection(s) --, therefor at each occurrence throughout the Issued Patent.

On the Title Page, in item (57), under "ABSTRACT", in Column 2, Line 13, delete "bearer (s)" and insert -- bearer(s) --, therefor.

In the Specification

In Column 1, Line 3, delete "COMMUNICATION" and insert -- COMMUNICATIONS --, therefor.

In Column 2, Line 6, delete "communication" and insert -- communications --, therefor.

In Column 4, Line 35, delete "Amore" and insert -- A more --, therefor.

In Column 5, Line 16, delete "communication" and insert -- communications --, therefor.

In Column 7, Line 7, delete "communication" and insert -- communications --, therefor.

In Column 7, Line 14, delete "communication" and insert -- communications --, therefor.

In the Claims

In Column 11, Line 17, in Claim 7, delete "communication" and insert -- communications --, therefor.

Signed and Sealed this
Twenty-third Day of February, 2016

Michelle K. Lee
*Director of the United States Patent and Trademark Office*

CERTIFICATE OF CORRECTION (continued)
U.S. Pat. No. 8,917,699 B2

In Column 11, Line 18, in Claim 7, delete "communication" and insert -- communications --, therefor.

In Column 13, Line 15, in Claim 18, delete "communication" and insert -- communications --, therefor.